(12) United States Patent
Ngo et al.

(10) Patent No.: US 7,719,695 B2
(45) Date of Patent: May 18, 2010

(54) SENSOR DEVICE WITH A RADIATION DIRECTING SURFACE

(75) Inventors: Klet Ngo, London (CA); Michael Reeve, London (CA); Erica Christina Martinez, London (CA)

(73) Assignee: OES, Inc., London, Ontario (CA)

( * ) Notice: Subject to any disclaimer, the term of this patent is extended or adjusted under 35 U.S.C. 154(b) by 380 days.

(21) Appl. No.: 11/399,175

(22) Filed: Apr. 6, 2006

(65) Prior Publication Data

US 2006/0227339 A1 Oct. 12, 2006

Related U.S. Application Data

(60) Provisional application No. 60/669,329, filed on Apr. 7, 2005.

(51) Int. Cl.
*G01B 11/24* (2006.01)
(52) U.S. Cl. ...................... 356/613; 356/614
(58) Field of Classification Search ......... 356/613–614, 356/621, 622, 634, 635, 638, 640, 394, 429–431, 356/445–446; 382/141; 250/559.29, 559.36; 348/125, 86; 29/564.4, 707, 720
See application file for complete search history.

(56) References Cited

U.S. PATENT DOCUMENTS

| | | | | |
|---|---|---|---|---|
| 5,125,741 A | * | 6/1992 | Okada et al. | 356/237.2 |
| 5,777,746 A | * | 7/1998 | Dlugos | 356/628 |
| 6,177,999 B1 | * | 1/2001 | Wurz et al. | 356/623 |
| 6,496,271 B1 | * | 12/2002 | Ngo | 356/613 |
| 6,717,684 B1 | * | 4/2004 | Fikes et al. | 356/614 |
| 7,042,568 B2 | * | 5/2006 | Mayo | 356/399 |
| 2001/0030751 A1 | * | 10/2001 | Bartholomew et al. | 356/445 |

\* cited by examiner

*Primary Examiner*—Gregory J Toatley, Jr.
*Assistant Examiner*—Tri T Ton
(74) *Attorney, Agent, or Firm*—Carlson, Gaskey & Olds PC

(57) ABSTRACT

A sensor device includes a source of radiation and a reflective surface having a contour that directs radiation reflected from the surface along a field having at least two parallel sides. In a disclosed example, the reflective surface contour is at least partially curvilinear. A disclosed example includes a laser diode as the source of radiation and the reflective surface directs the reflected radiation in a direction that is generally perpendicular relative to a path that light follows as it emanates from the laser diode. The reflective surface in one example shapes the reflected radiation from a source that provides radiation along a path with obliquely oriented sides, the reflected radiation has at least two parallel sides. A disclosed sensor device is useful for measuring at least one feature of a part or object placed within a field of view of a sensing element that can detect the reflected radiation.

11 Claims, 1 Drawing Sheet

SENSOR DEVICE WITH A RADIATION DIRECTING SURFACE

CROSS REFERENCE TO RELATED APPLICATION

This application claims priority to U.S. Provisional Application No. 60/669,329 which was filed on Apr. 7, 2005.

FIELD OF THE INVENTION

This invention generally relates to sensing devices. More particularly, this invention relates to devices for analyzing part profiles.

DESCRIPTION OF THE RELATED ART

A variety of sensing devices are known for use in manufacturing situations. For example, electrical assemblies that require hardwire connections typically rely upon particular qualities of the wire ends to ensure good connections. There are known sensors for monitoring the profile of the wire ends to determine quality and ensure better assembly.

One such device is shown in U.S. Pat. No. 6,496,271. While the device shown in that patent represents a substantial improvement in the art, those involved in the industry are constantly striving to make improvements.

FIG. 1 schematically shows one known arrangement of a sensing device 20. A part such as a wire end can be passed through a viewing window 22 such that the part interrupts illumination 24 of a sensing portion 26. Based on the amount of interruption of the illumination 24, a controller (not illustrated) makes a determination regarding at least one characteristic of the part placed within the viewing window 22.

In the example of FIG. 1, a laser light source 28 such as a laser diode provides the illumination 24. As can be appreciated from the drawing, the illumination 24 emanates from the laser diode 28 in a fan-like or triangular manner. There are several disadvantages with such an arrangement. Because the edges of the illumination field 24 are not parallel to the field of view of the sensing element 26, it is possible for an image resulting from a part passing through the viewing window 22 to be distorted or stretched. This problem can become even more cumbersome if the parts are passed through different vertical planes (according to the drawing) within the viewing window 22. Additionally, the full length of the sensing element 26 cannot effectively be utilized because of the fan-like, triangular projection of the illumination 24 from the laser diode 28. Another shortcoming of such arrangements is that a sufficient distance must exist between the sensing element 26 and the laser diode 28, which results in a relatively large size of the overall device 20.

One possible solution to overcome these drawbacks would be to introduce a biconvex lens between the laser diode 28 and the sensing element 26 to effectively create an illumination field having parallel edges for illuminating the entire sensing element 26. Such an arrangement is not practical for most applications because the distances required to achieve appropriate focal points and the additional spacing required to accommodate the lens would render the device 20 too large to fit within most manufacturing application constraints.

There is a need for an improved sensor device that does not include the shortcomings and drawbacks mentioned above. This invention addresses that need.

SUMMARY OF THE INVENTION

One example sensor device includes a source of radiation and a reflective surface having a contour for shaping and directing a radiation field such that it has at least two parallel sides.

In one example, the reflected radiation field comprises a parallel beam.

In one example, the reflective surface has an at least partially curvilinear contour. One example reflective surface comprises a mirror.

An advantage of a disclosed example is that it allows for more compact sensor device design. One example includes the source of radiation generally perpendicularly oriented relative to the radiation field having the parallel sides. Space savings are almost always of a concern in manufacturing environments. Moreover, the example arrangement is applicable for a wider variety of situations.

Another advantage to a disclosed example is that it allows for utilizing an entire length of a sensing element. Moreover, the reflected radiation field allows greater flexibility in the position of a part within a sensing window of the device and is not subject to any undesirable distortion effects.

The various features and advantages of this invention will become apparent to those skilled in the art from the following detailed description. The drawings that accompany the detailed description can be briefly described as follows.

AN EXAMPLE EMBODIMENT

Figure 1:
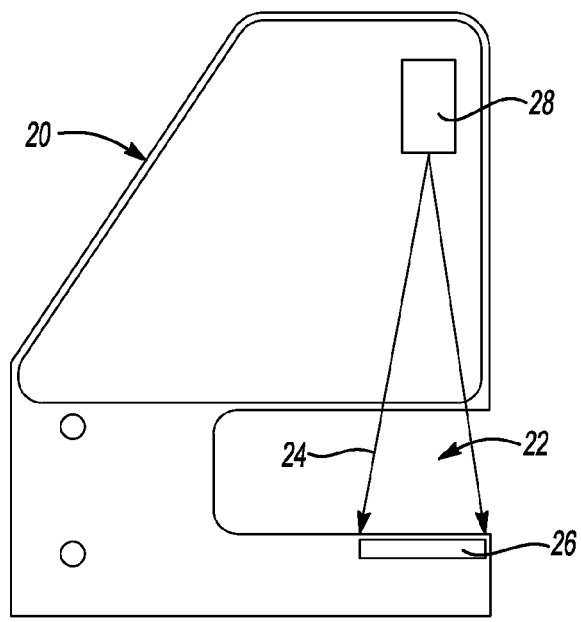
FIG. 1 schematically shows selected portions of a known sensor device.
Figure 2:
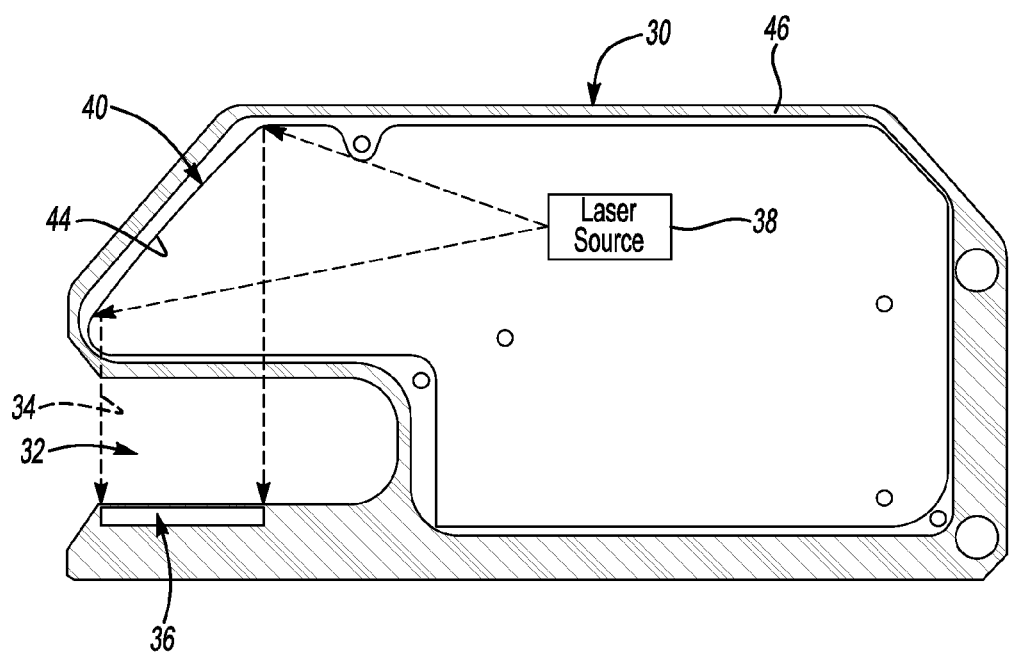
FIG. 2 schematically shows selected portions of an example sensor device designed according to an embodiment of this invention.

FIG. 2 schematically shows a sensor device 30 having a viewing window 32 through which a part such as a wire end may be passed. As the part passes through the viewing window 32, it interrupts a field of radiation 34 that otherwise irradiates a sensing element 36. In one example, the sensing element 36 comprises a CCD receiver and the radiation comprises light. Other types of radiation are used in some examples with correspondingly configured sensing elements. The amount of interruption of the radiation field 34, as detected by the sensing element 36, provides information for determining at least a characteristic or feature of an object within the viewing window 32. In one example, the sensor device 30 is useful for determining a part profile such as the profile of an end of a wire.

As can be appreciated from FIG. 2, the radiation field 34 incident on the sensing element 36 has at least two parallel sides projecting at a generally perpendicular angle relative to the orientation of the sensing element 36. In other words, the parallel sides of the radiation field 34 are parallel to each other and to a field of view of the sensing element 36. The radiation field 34 in this example is referred to as a parallel beam. Some examples have four parallel sides that establish the boundaries of a generally rectangular parallel beam radiation field 34.

A radiation source 38, such as a laser diode in one example, provides the radiation or energy for the radiation field (e.g., parallel beam) 34. As schematically shown in FIG. 2, the radiation emanating from the radiation source 38 follows a path that begins in a fan-like manner having edges that are not parallel. In this example, the path of the radiation from the source 38 has obliquely oriented sides. One example includes a lens associated with the source 38 to shape a cone of the radiation into a planar fan pattern.

A reflective surface 40 shapes and directs the radiation originally emanating from the radiation source 38 and reflected from the surface 40 to provide a reflected radiation field 34 and direct it onto the sensing element 36. In this example, an initial direction of the path of the radiation from the source 38 is generally perpendicular to the direction of the parallel sides of the reflected radiation field 34.

In one example, the reflective surface 40 is at least partially curvilinear. One example reflective surface 40 comprises a curvilinear mirror that is bonded to an interior surface 44 within a housing 46 of the device 30. One example includes machining the interior surface 44 to the shape that the reflective surface 40 must have to provide the desired characteristics of the reflected radiation field (e.g., parallel beam) 34 based upon the expected position and characteristics of the radiation source 38 within the housing 46. Given this description, those skilled in the art will be able to select appropriate reflective surface materials and to custom design the particular shape of the reflective surface to realize a reflected radiation field that meets their particular needs.

One advantage of the example of FIG. 2 is that the radiation source 38 can be positioned in a variety of locations within the device 30. The reflective surface 40 allows greater flexibility in source selection and position. Moreover, the overall size of the device 30 may be made smaller so that it is more compact and useable in a wider variety of manufacturing environments.

Another advantage to the disclosed example is that it is insensitive to the particular location of the part or object within the viewing window 32. This allows for less stringent control on part positioning within the viewing window, which may improve cycle times and introduce improved economies during manufacturing processes.

In the illustrated example, the parallel sides are aligned with edges of the sensing element 36 so that an object within the viewing window 32 will block an amount of the radiation otherwise incident on the sensing element 36 that is constant regardless of the distance between the object and the sensing element. The parallel sides of the field 34 in one example prevent a situation where an object at a first height relative to the sensing element 36 blocks a first amount of the radiation and the same or a matching object at a different height blocks a second, different amount of the radiation. Given this description and depending on the orientation of the components of the sensor device and an expected direction of movement of an object through the viewing window 32, the number of parallel sides can be selected and oriented to meet the needs of a particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor device, comprising
    a housing;
    a source of radiation;
    a reflective surface supported within the housing and positioned in a path of radiation from the source and having a contour that directs radiation reflected from the surface along a field, the reflective surface contour shaping the reflected radiation into the field so that the field has at least two sides that are parallel to each other as the reflected radiation leaves the reflective surface; and
    a sensing element positioned in a path of the field such that the reflected radiation can be incident on the sensing element, the sensing element detecting an amount of interruption of the field that otherwise irradiates the sensing element to provide information regarding at least a feature of an object in the field between the sensing element and the reflective surface that causes the interruption, wherein the sensing element is supported by the housing so that there is a viewing window through which the reflected radiation passes as the radiation moves from the reflective surface directly at the sensing element.

2. The sensor device of claim 1, wherein the reflective surface has a curvilinear contour.

3. The sensor device of claim 1, wherein the reflective surface comprises a mirror.

4. The sensor device of claim 1, wherein the field comprises a parallel beam.

5. The sensor device of claim 1, wherein the reflective surface contour is shaped to provide the field with two sets of parallel sides.

6. The sensor device of claim 5, wherein the reflective surface contour is shaped to establish the field as a generally rectangular parallel beam.

7. The sensor device of claim 1
    wherein the sensing element has a field of view that is aligned with the sides of the field that are parallel to each other and an amount of the reflected radiation incident on the sensing element provides an indication of a feature sensed by the sensor device.

8. The sensor device of claim 1, wherein the path of radiation follows a direction that is generally perpendicular to a direction of the at least two sides that are parallel to each other.

9. The sensor device of claim 1, comprising a housing that supports the source of radiation and the reflective surface and wherein the housing includes at least one interior surface having a contour that at least partially establishes the contour of the reflective surface.

10. The device of claim 1, wherein the radiation path has at least two sides obliquely oriented relative to each other.

11. The sensor device of claim 1, wherein the parallel sides of the field are spaced from each other a distance corresponding to a width of the sensing element.

* * * * *